United States Patent
Sarawate et al.

(10) Patent No.: US 10,161,523 B2
(45) Date of Patent: *Dec. 25, 2018

(54) ENHANCED CLOTH SEAL

(75) Inventors: Neelesh Nandkumar Sarawate, Niskayuna, NY (US); David Wayne Weber, Simpsonville, SC (US); Omprakash Samudrala, Clifton Park, NY (US); Victor John Morgan, Simpsonville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 1162 days.

This patent is subject to a terminal disclaimer.

(21) Appl. No.: 13/336,750

(22) Filed: Dec. 23, 2011

(65) Prior Publication Data

US 2013/0161914 A1 Jun. 27, 2013

(51) Int. Cl.
*F16J 15/02* (2006.01)
*F16J 15/08* (2006.01)
*F01D 11/00* (2006.01)

(52) U.S. Cl.
CPC ......... *F16J 15/0812* (2013.01); *F01D 11/006* (2013.01); *F05D 2240/57* (2013.01); *F05D 2300/6012* (2013.01)

(58) Field of Classification Search
CPC ............... F01D 11/006; F05D 2240/57; F05D 2300/6012
USPC ............. 415/134–136, 138–139, 191, 214.1; 277/312, 641, 654, 647, 628, 409, 650, 277/651, 652, 649

See application file for complete search history.

(56) References Cited

U.S. PATENT DOCUMENTS

| 4,645,217 A | * | 2/1987 | Honeycutt et al. ........... 277/555 |
| 5,154,577 A | | 10/1992 | Mellock et al. |
| 5,168,485 A | | 12/1992 | Starkweather |
| 5,509,669 A | | 4/1996 | Wolfe et al. |

(Continued)

FOREIGN PATENT DOCUMENTS

| CN | 101629520 A | 1/2010 |
| DE | 10200501925083 B3 | 9/2006 |
| GB | 2284867 A | 6/1995 |

OTHER PUBLICATIONS

Search Report and Written Opinion from corresponding EP Application No. 12197051.1-1751 dated May 3, 2013.

(Continued)

*Primary Examiner* — Vishal A Patel
*Assistant Examiner* — Thomas L Neubauer
(74) *Attorney, Agent, or Firm* — GE Global Patent Operation; Pabitra Chakrabarti

(57) ABSTRACT

The embodiments described herein provide a cloth seal for use with turbine components. The cloth seal includes first and second cloth layers. One or more central shims are positioned between the first and second cloth layers so as to block a leakage flow path. Another shim is positioned on and seals the opposite side of the first cloth layer from the one or more central shims positioned between the first and second cloth layers so as to block another leakage flow path. Yet another sealing shim may be positioned on the opposite side of the second cloth layer from the one or more central shims positioned between the first and second cloth layers to as to seal the opposite side of the second cloth layer and block another leakage flow path.

3 Claims, 6 Drawing Sheets

(56) References Cited

U.S. PATENT DOCUMENTS

Figure 1:
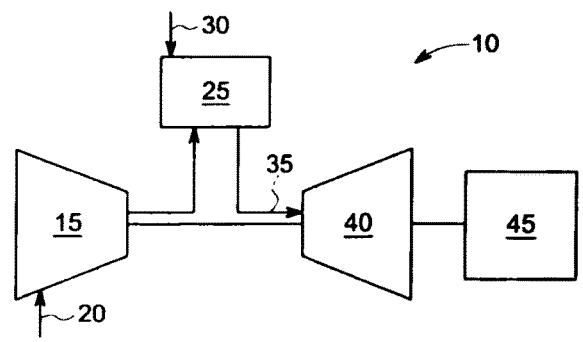

| | | | |
|---|---|---|---|
| 5,527,047 A | 6/1996 | Waterland, III | |
| 5,531,457 A | 7/1996 | Tibbott et al. | |
| 5,627,998 A | 5/1997 | Mondrik et al. | |
| 5,657,998 A | 8/1997 | Dine et al. | |
| 5,823,741 A | 10/1998 | Predmore et al. | |
| 5,868,398 A | 2/1999 | Maier et al. | |
| 5,915,697 A | 6/1999 | Bagepalli et al. | |
| 5,934,687 A * | 8/1999 | Bagepalli et al. | 277/637 |
| 5,997,247 A | 12/1999 | Arraitz et al. | |
| 6,162,014 A | 12/2000 | Bagepalli et al. | |
| 6,220,606 B1 | 4/2001 | Kawaguchi et al. | |
| 6,502,825 B2 | 1/2003 | Aksit et al. | |
| 6,503,051 B2 | 1/2003 | Predmore | |
| 6,619,669 B2 | 9/2003 | Zhuo et al. | |
| 6,637,752 B2 | 10/2003 | Aksit et al. | |
| 6,652,231 B2 * | 11/2003 | Vedantam | F01D 11/005 277/637 |
| 6,733,234 B2 * | 5/2004 | Paprotna et al. | 415/138 |
| 7,152,864 B2 | 12/2006 | Amos et al. | |
| 7,334,800 B2 * | 2/2008 | Minnich | 277/644 |
| 7,389,991 B2 | 6/2008 | Riggi, Jr. et al. | |
| 8,186,167 B2 | 5/2012 | Chila et al. | |
| 8,678,754 B2 * | 3/2014 | Morgan et al. | 415/138 |
| 2002/0121744 A1 | 9/2002 | Aksit et al. | |
| 2003/0039542 A1 | 2/2003 | Cromer | |
| 2004/0052637 A1 | 3/2004 | Paprotna et al. | |
| 2004/0240986 A1 | 12/2004 | Burdgick | |
| 2006/0091617 A1 | 5/2006 | Minnich | |
| 2008/0258399 A1 | 10/2008 | Gelorme et al. | |
| 2008/0298956 A1 | 12/2008 | Eastman et al. | |
| 2009/0085305 A1 | 4/2009 | Demiroglu et al. | |
| 2010/0072710 A1 | 3/2010 | Morgan et al. | |
| 2010/0143103 A1 | 6/2010 | Sellars et al. | |
| 2010/0247300 A1 | 9/2010 | Morgan | |
| 2011/0241297 A1 | 10/2011 | Morgan et al. | |
| 2012/0133102 A1 * | 5/2012 | Samudrala et al. | 277/654 |

OTHER PUBLICATIONS

Unofficial English Translation of Chinese Office Action issued in connection with corresponding CN Application No. 201210562732 dated Apr. 4, 2015.

* cited by examiner

ENHANCED CLOTH SEAL

BACKGROUND

The subject matter of this disclosure relates generally to cloth seals for use with turbo-machinery such as gas turbine engines and more particularly relates to a cloth seal with reduced surface leakage therethrough.

Generally described, turbo-machinery, such as gas turbine engines and the like, includes a main gas flow path therethrough. The main gas flow path generally includes a gas intake, a compressor, a combustor, a turbine, and a gas outlet. Gas leakage, both out of the gas flow path or into the gas flow path, may be detrimental to overall engine performance and is generally otherwise undesirable. Gas path leakage may lower the efficiency of the gas turbine engine, increase fuel costs, and possibly increase emission levels.

Secondary gas flows may be used within the gas turbine engine to cool the various heated components. Specifically, cooling air extracted from the later stages of the compressor in a gas turbine engine may be used for cooling the components therein and for purging gaps and cavities between adjacent components. Cloth seals may be mounted in slots between the adjacent components so as to control the amount of the secondary flow extracted by metering its leakage into the hot gas path. Cloth seals hence are widely used to control the amount of cooling and purge air required to prevent hot gas ingestion and overheating of turbine parts such as shrouds, nozzles, and the like. Cloth seals thus may seal the gaps between adjacent turbine parts (shroud/shroud, shroud/nozzle, etc.) that are needed to accommodate typical thermal and mechanical transients during turbine engine operation. Cloth seals provide the dual advantage of effectively sealing these gaps while also providing good wear resistance due to the presence of the sacrificial cloth layers.

Reducing the leakage through the cloth seals themselves thus may reduce the amount of the secondary flow extracted from the compressor stages. Likewise, the reduced leakage through the cloth seals may result in improved overall thermal efficiency and power output from the turbine. State-of-the-art cloth seal structures rely on cloth materials to implement sealing or otherwise employ some form of protruding shim that does not adequately reduce or eliminate leakage rates any time there is a pressure drop across only the cloth portion of the seal.

There is thus a need for an improved cloth seal structure. Such an improved structure should limit leakage flow through the segment gap between adjacent seal slots. Reducing the leakage therethrough may improve the overall efficiency and power output of the gas turbine engine as a whole.

BRIEF DESCRIPTION

According to one embodiment, a cloth seal comprises:
a first cloth layer;
a second cloth layer;
one or more central shims positioned between the first and second cloth layers so as to block a leakage flow path through at least one of the cloth layers; and
a second shim positioned on the opposite side of the first cloth layer from the one or more central shims, the second shim sealing the opposite side of the first cloth layer so as to block another leakage flow path through at least one of the cloth layers.

According to another embodiment, a cloth seal comprises:
a first cloth layer disposed between adjacent turbine components;
a second cloth layer disposed between the adjacent turbine components;
one or more central shims positioned between the first and second cloth layers so as to block a leakage flow path through at least one of the cloth layers and exiting a slot common to the adjacent turbine components; and
a second shim positioned on the opposite side of the first cloth layer from the one or more central shims, the second shim sealing the opposite side of the first cloth layer so as to block another leakage flow path through at least one of the cloth layers and exiting the common slot.

These and other features and improvements of the present application will become apparent to one of ordinary skill in the art upon review of the following detailed description when taken in conjunction with the several drawings and the appended claims.

DRAWINGS

Figure 2:
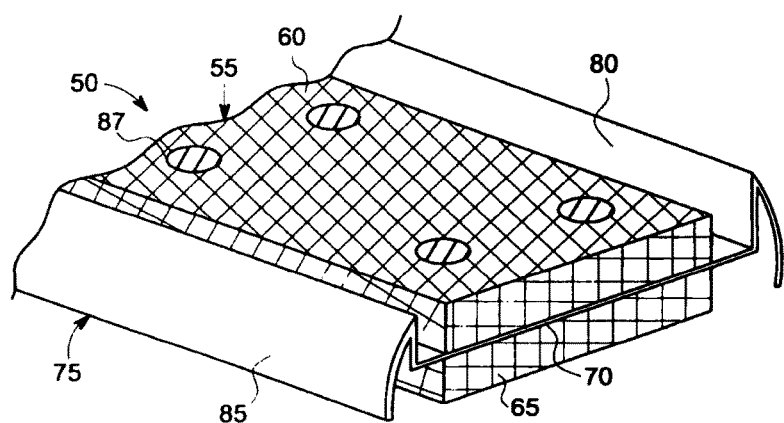
Figure 3:
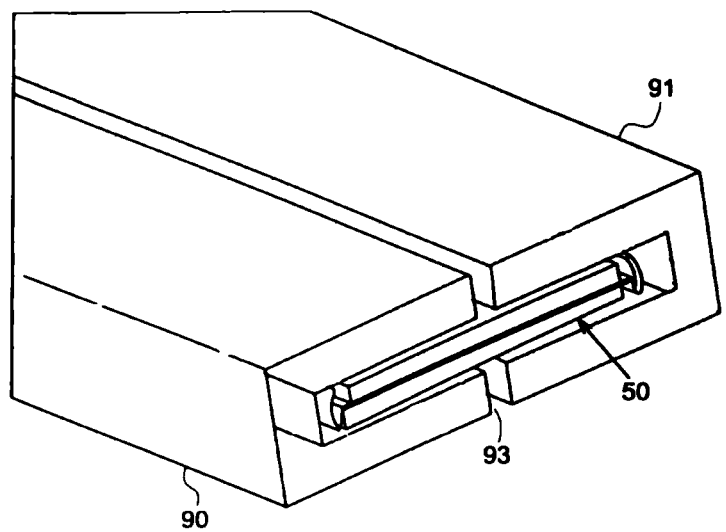
Figure 4:
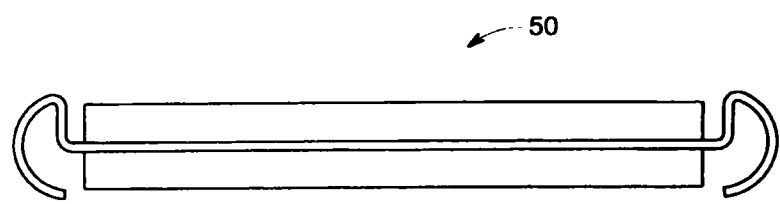
Figure 5:
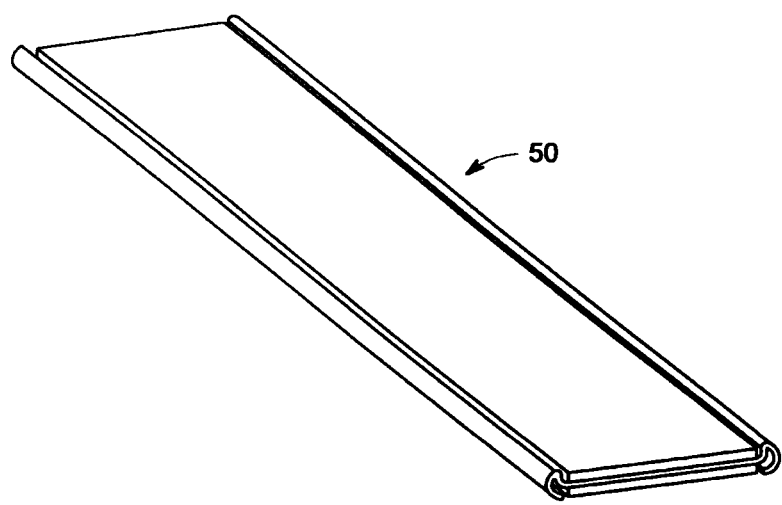
Figure 6:
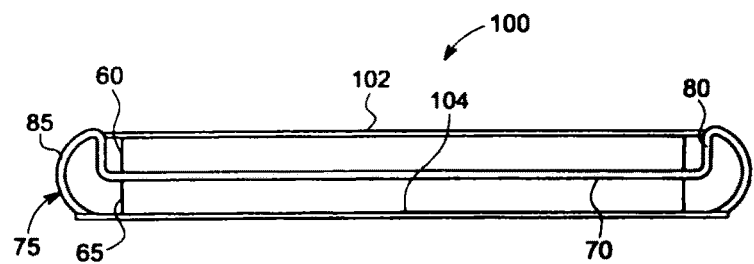
Figure 7:
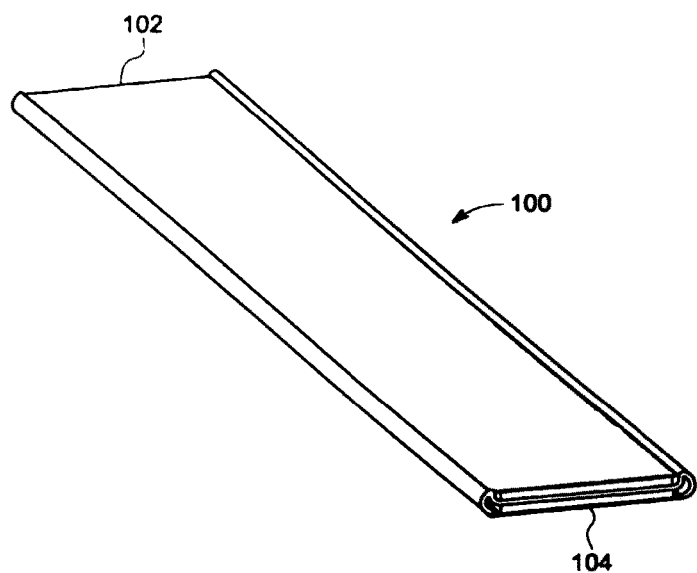
Figure 8:
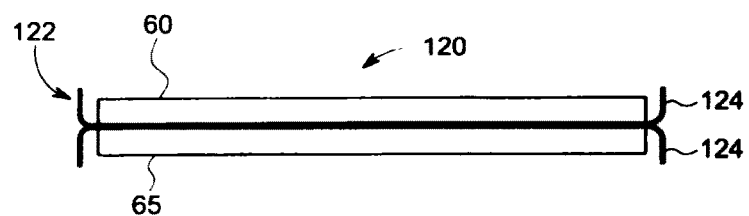
Figure 9:
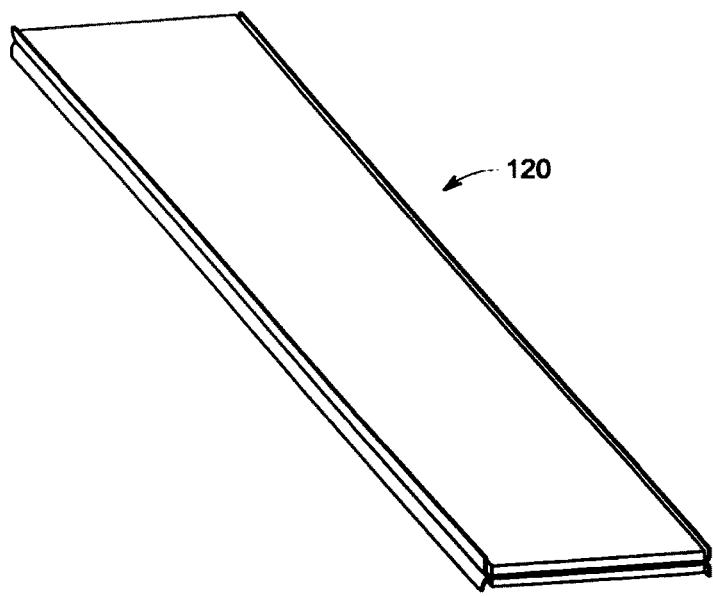
Figure 10:
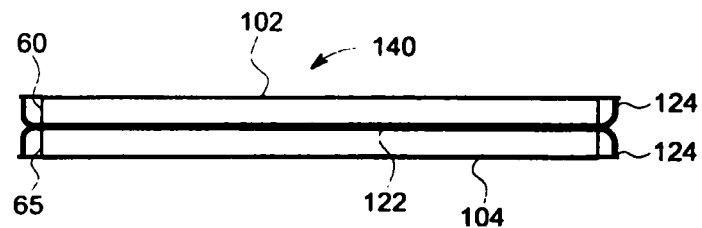
Figure 11:
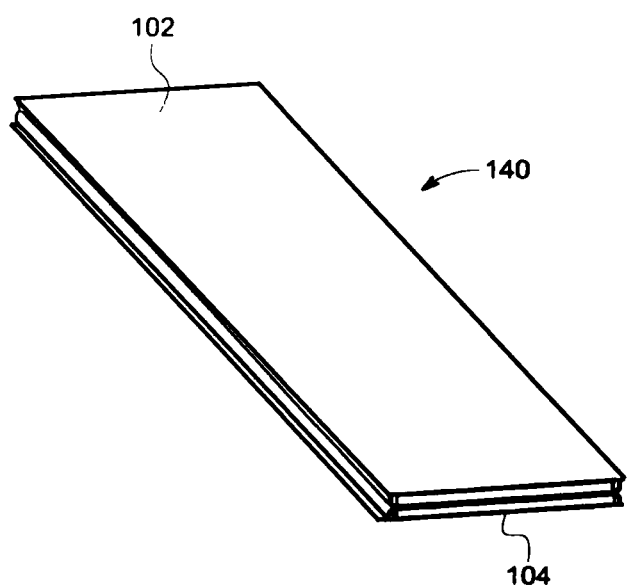

The foregoing and other features, aspects and advantages of the invention are apparent from the following detailed description taken in conjunction with the accompanying drawings in which like characters represent like parts throughout the drawings, wherein:

FIG. 1 is a schematic view of a gas turbine engine;
FIG. 2 is a partial perspective view of a known cloth seal;
FIG. 3 is a partial perspective view of a known cloth seal positioned between turbine components;
FIG. 4 is a side view of the cloth seal illustrated in FIG. 3;
FIG. 5 is a perspective view of the cloth seal illustrated in FIG. 3;
FIG. 6 is a side view of a cloth seal according to one embodiment of the present invention;
FIG. 7 is a perspective view of the cloth seal illustrated in FIG. 6;
FIG. 8 is a side view of another known cloth seal;
FIG. 9 is a perspective view of the known cloth seal illustrated in FIG. 8;
FIG. 10 is a side view of a cloth seal according to another embodiment of the present invention; and
FIG. 11 is a perspective view of the cloth seal illustrated in FIG. 10.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

Referring now to the drawings, in which like numerals refer to like elements throughout the several views, FIG. 1 shows a schematic view of a rotary machine such as gas turbine engine 10. The gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a compressed flow of fuel 30 and ignites the mixture to create a flow of combustion gases 35. Although only a single combustor 25 is shown, the gas turbine engine 10 may include any number of combustors 25. The flow of combustion gases 35 is delivered in turn to a turbine 40. The flow of combustion gases 35 drives the turbine 40 so as to produce mechanical work. The mechanical work produced in the turbine 40 drives the compressor 15 and an external load 45 such as an electrical generator and the like.

The gas turbine engine 10 may use natural gas, various types of syngas, and/or other types of fuels. The gas turbine engine 10 may be one of any number of different gas turbine engines. The gas turbine engine 10 may have other configurations and may use other types of components. Other types of gas turbine engines also may be used herein. Multiple gas turbine engines 10, other types of turbines, and other types of power generation equipment also may be used herein together. Other types of rotary machines also may be used herein.

FIG. 2 shows an example of a known cloth seal 50. The cloth seal 50 may include a number of cloth layers 55. The cloth layers 55 may comprise a woven metallic cloth. The cloth layers 55 also may include composites, ceramics, and combinations thereof. In this example, an upper cloth layer 60 may be separated from a lower cloth layer 65 via a shim 70. The shim 70 may be made from stainless steel or other types of materials. The shim 70 may extend substantially along the length and width of the cloth seal 50. The shim 70 also may include a number of side flanges 75 extending from the sides of the cloth layers 55. The side flanges 75 may include a linear leg 80 and an arcuate leg 85. Other shapes may be used herein. The cloth layers 55 may be spot welded 87 to the shim 70 or otherwise attached. Multiple shim layers also may be used herein. The cloth seal 50 may have any desired size or shape. Other types and other configurations of the cloth seal 50 may be known.

FIG. 3 shows the use of the known cloth seal 50 within a number of turbine components including a first component 90 and a second component 91. The components 90, 91 have a slot gap 93 therebetween. The components 90, 91 may be shrouds, nozzles, or any type of adjacent components. FIGS. 4 and 5 illustrate simplified side and perspective views respectively of the known cloth seal 50.

FIGS. 6 and 7 illustrate simplified side and perspective views respectively of a cloth seal 100 according to one embodiment of the present invention. The cloth seal 100 may include a number of cloth layers 60, 65. In this embodiment, an upper cloth layer 60 and a lower cloth layer 65 may be used. Any number of the cloth layers may be used herein. A first/central shim 70 may separate the upper cloth layer 60 and the lower cloth layer 65. The shim 70 may extend substantially along the length and width of the cloth seal 100. The shim 70 may be made from stainless steel or other types of materials. The shim 70 also may include a number of side flanges 75. In this example, the side flanges 75 may include a linear leg 80 and an arcuate leg 85. Other shapes also may be used herein. The cloth layers 60, 65 may be spot welded to the shim 70 or otherwise attached. Multiple shim layers also may be used herein. The cloth seal 100 as a whole may have any desired size or shape. Other types and other configurations of the cloth seal 100 may be known.

In this embodiment, the cloth seal 100 also may include a second/top shim/seal 102 that may extend substantially along the length and width of the upper cloth layer 60. Second shim 102 may extend to the side flange 75 to form a seal between cloth layer 60 and the side flange 75. The cloth seal 100 also may include a third/bottom shim/seal 104 that may extend substantially along the length and width of the bottom cloth layer 65. Third shim 104 may extend to the side flange 75 to form a seal between the cloth layer 65 and the side flange 75. The second/top shim/seal 102 largely covers the upper cloth layer 60. The third/lower shim/seal 104 largely covers the lower cloth layer 65. Since leakage flow can exit through the segment gap 93 depicted in FIG. 3, any physical barrier on top of the segment gap 93, near the exit area will block this leakage. The second/top and third/bottom shims 102, 104 cover all the exit area to the leakage flow from the sides of the cloth layers 60, 65. The second/top and third/bottom shims 102, 104 thus prevent some of the through leakage as well as provide a better sealing surface during radial and skew surface offsets.

The central cloth seal shim 70 will also act as a sealing surface if shims 102, 104 wear out or deteriorate. Although the addition of shims 102, 104 may require further compression and stiffening of the cloth layers 60, 65, any gain achieved by blocking the cloth-side leakage is anticipated to be significantly higher than any performance degradation that may occur due to a stiffer seal.

FIG. 8 is a side view of another known cloth seal 120. Cloth seal 120 includes a central seal shim 122 that has a pair of double bent end flanges 124. The shim 122 may extend beyond cloth layers 60, 65 of the cloth seal 120 and end in the end flange seal 124. FIG. 9 is a perspective view of the cloth seal 120.

FIG. 10 illustrates a cloth seal 140 with double bent end flanges 124 in accordance with another embodiment of the present invention. The cloth seal 140 may include a number of cloth layers 60, 65. In this embodiment, an upper cloth layer 60 and a lower cloth layer 65 may be used. Any number of the cloth layers may be used herein. A shim 122 may separate the upper cloth layer 60 and the lower cloth layer 65. The shim 122 may extend substantially along the length and width of the cloth seal 140. The shim 122 may be made from stainless steel or other types of materials. The shim 122 also may include a number of side flanges 124. Other shapes also may be used herein. The cloth layers 60, 65 may be spot welded to the shim 122 or otherwise attached. Multiple shim layers also may be used herein. The cloth seal 140 as a whole may have any desired size or shape. Other types and other configurations of the cloth seal 140 may be known.

In this embodiment, the cloth seal 140 also includes a second/top shim/seal 102 that may extend substantially along the length and width of the upper cloth layer 60. The cloth seal 140 also may include a third/bottom shim/seal 104 that may extend substantially along the length and width of the bottom cloth layer 65. The top shim/seal 102 largely covers the upper cloth layer 60. The lower shim/seal 104 largely covers the lower cloth layer 65. At least one of the shims 102, 104 may extend to the side flanges 124 that may comprise, without limitation, one or more bent flanges or double bent flanges. The top and bottom shims 102, 104 cover all the exit area to the leakage flow from the sides of the cloth layers 60, 65. The top and bottom shims 102, 104 thus prevent some of the through leakage as well as provide a better sealing surface during radial and skew surface offsets.

In summary explanation, a cloth seal for use with turbine components may include a number of cloth layers, a central shim positioned between the cloth layers, and an end seal positioned at an end of the cloth layers so as to block a leakage flow path through at least one of the cloth layers. The cloth seal may further include a top side face shim, a bottom side face shim, or both so as to block another leakage flow path through at least one of the cloth layers. The top face and bottom face shims provide a physical barrier to substantially prevent leakage flow exiting through the segment gap portion of turbine shrouds, nozzles, or any type of adjacent components and also provide improved surface sealing during radial and skew offsets.

It should be apparent that the foregoing relates only to certain embodiments of the present application and that numerous changes and modifications may be made herein by one of ordinary skill in the art without departing from the general spirit and scope of the invention as defined by the following claims and the equivalents thereof.

We claim:

1. A cloth seal, comprising:
   a first cloth layer;
   a second cloth layer;
   one or more central shims positioned between the first and second cloth layers so as to block a leakage flow path through at least one of the cloth layers, wherein the one or more central shims comprise seals selected from a double bent flange seal comprising side flanges, a pair of bent flange seals comprising side flanges or at least one curved hook flange seal comprising side flanges;
   a second shim positioned on the opposite side of the first cloth layer from the one or more central shims, the second shim completely covering and sealing the opposite side of the first cloth layer so as to block another leakage flow path through at least one of the cloth layers, wherein the second shim extends to at least one pair of the side flanges; and
   a third shim positioned on the opposite side of the second cloth layer from one or more central shims, the third shim completely covering and sealing the opposite side of the second cloth layer so as to block another leakage flow path through at least one of the cloth layers, wherein the third shim extends to either the same pair of the side flanges that the second shim extends to or to another pair of the side flanges.

2. The cloth seal according to claim 1, wherein the cloth seal is disposed between adjacent turbine components.

3. A cloth seal, comprising:
   a first cloth layer disposed between adjacent turbine components;
   a second cloth layer disposed between the adjacent turbine components;
   one or more central shims positioned between the first and second cloth layers so as to block a leakage flow path through at least one of the cloth layers and exiting a slot common to the adjacent turbine components, wherein the one or more central shims comprise seals selected from a double bent flange seal comprising side flanges, a pair of bent flange seals comprising side flanges or at least one curved hook flange seal comprising side flanges;
   a second shim positioned on the opposite side of the first cloth layer from the one or more central shims, the second shim completely covering and sealing the opposite side of the first cloth layer so as to block another leakage flow path through at least one of the cloth layers and exiting the common slot, wherein the second shim extends to at least one pair of the side flanges; and
   a third shim positioned on the opposite side of the second cloth layer from one or more central shims, the third shim completely covering and sealing the opposite side of the second cloth layer so as to block another leakage flow path through at least one of the cloth layers, wherein the third shim extends to either the same pair of the side flanges that the second shim extends to or to another pair of the side flanges.

* * * * *